Sept. 20, 1966     G. W. McFARLAND     3,273,942
VACUUM BULK CARGO UNLOADING SYSTEM FOR SHIPS
Filed Sept. 17, 1964     5 Sheets-Sheet 3
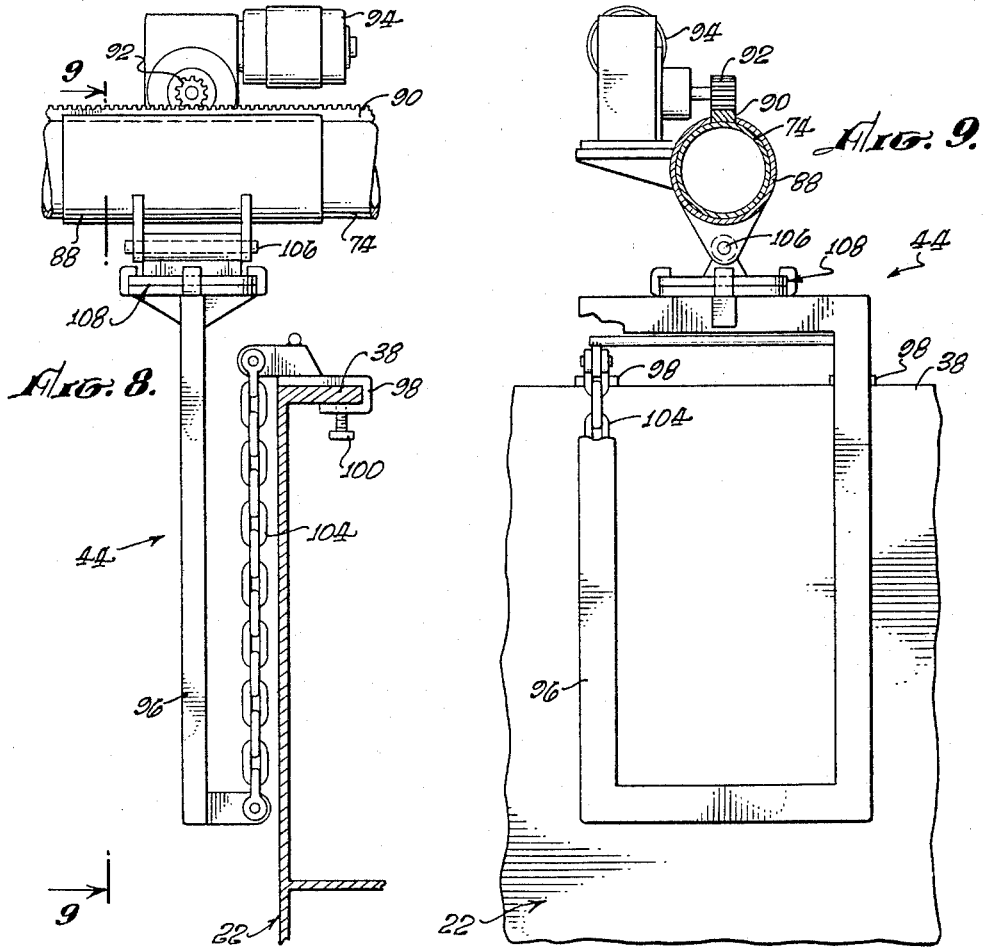
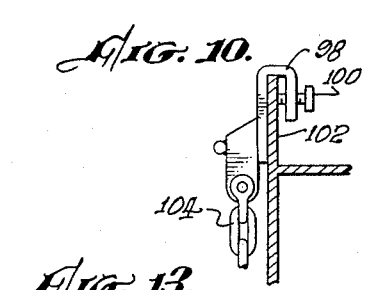
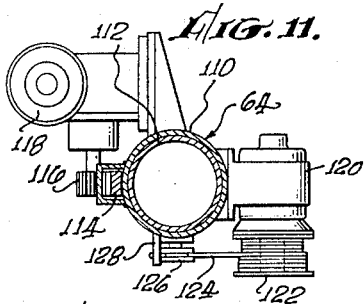
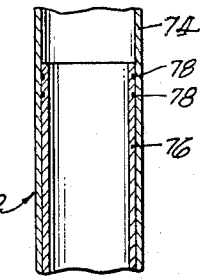
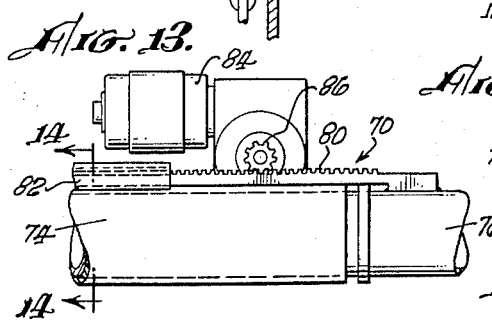
GLEN W. McFARLAND,
INVENTOR.
BY HIS ATTORNEYS
HARRIS, KIECH, RUSSELL & KERN.

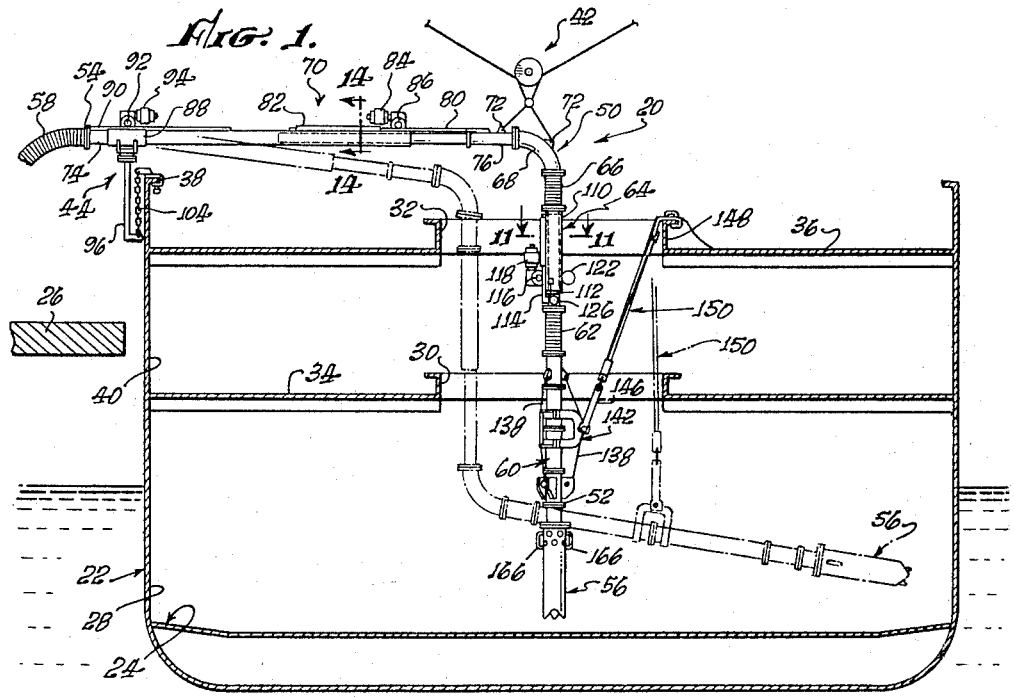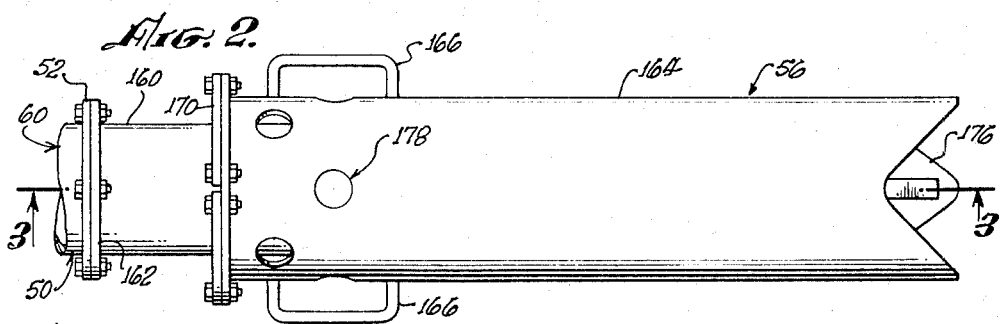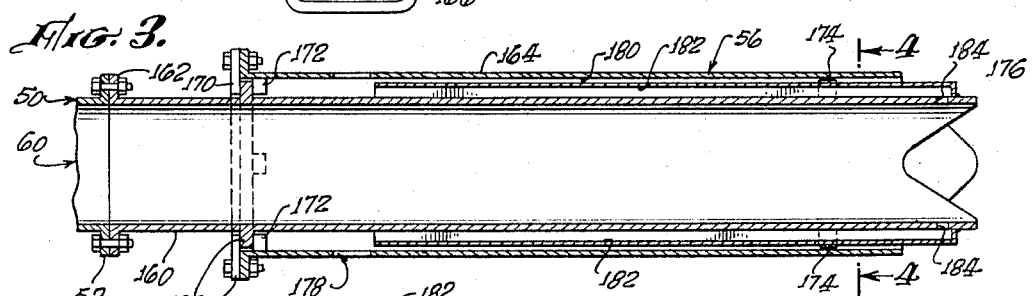

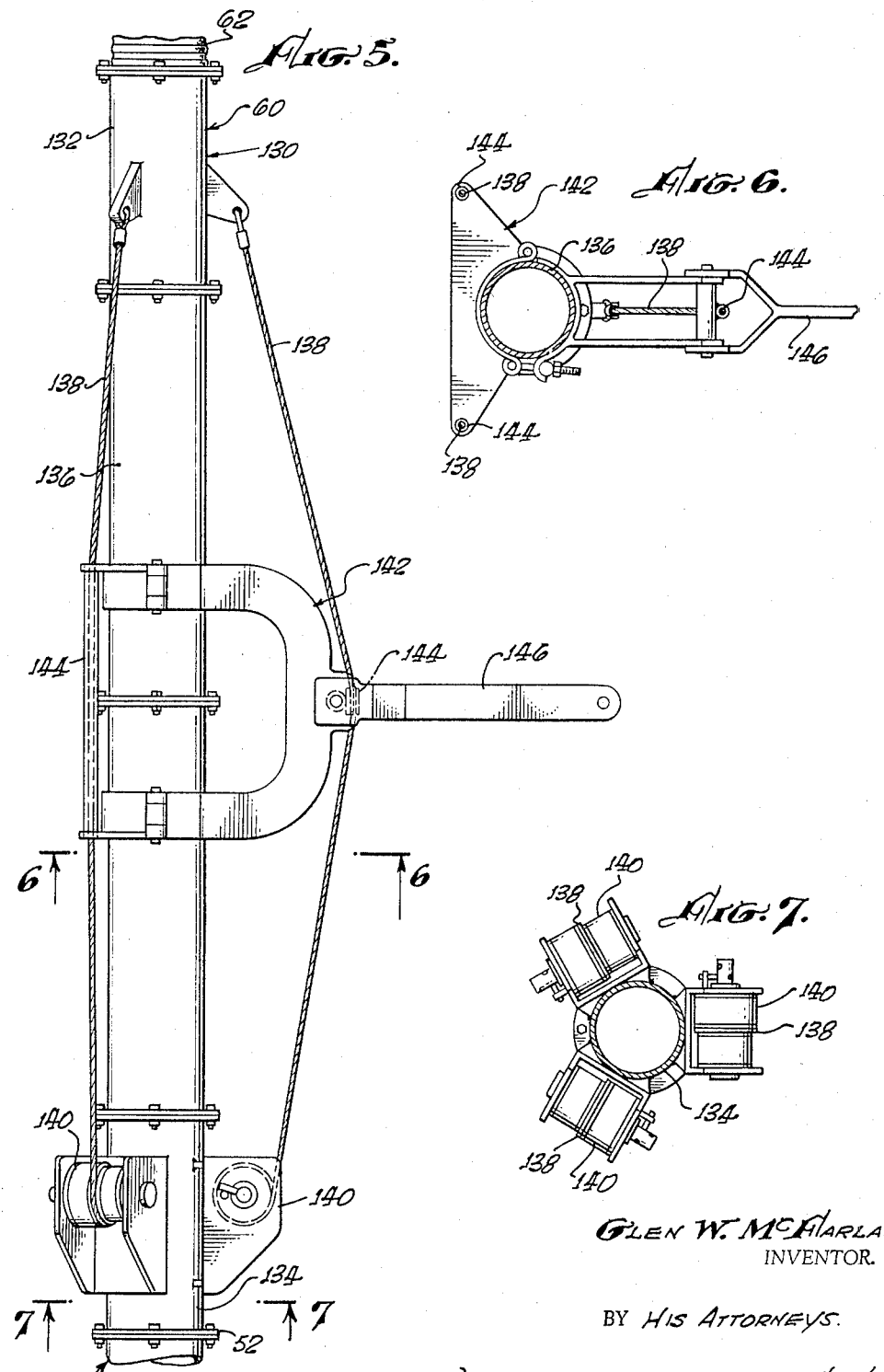

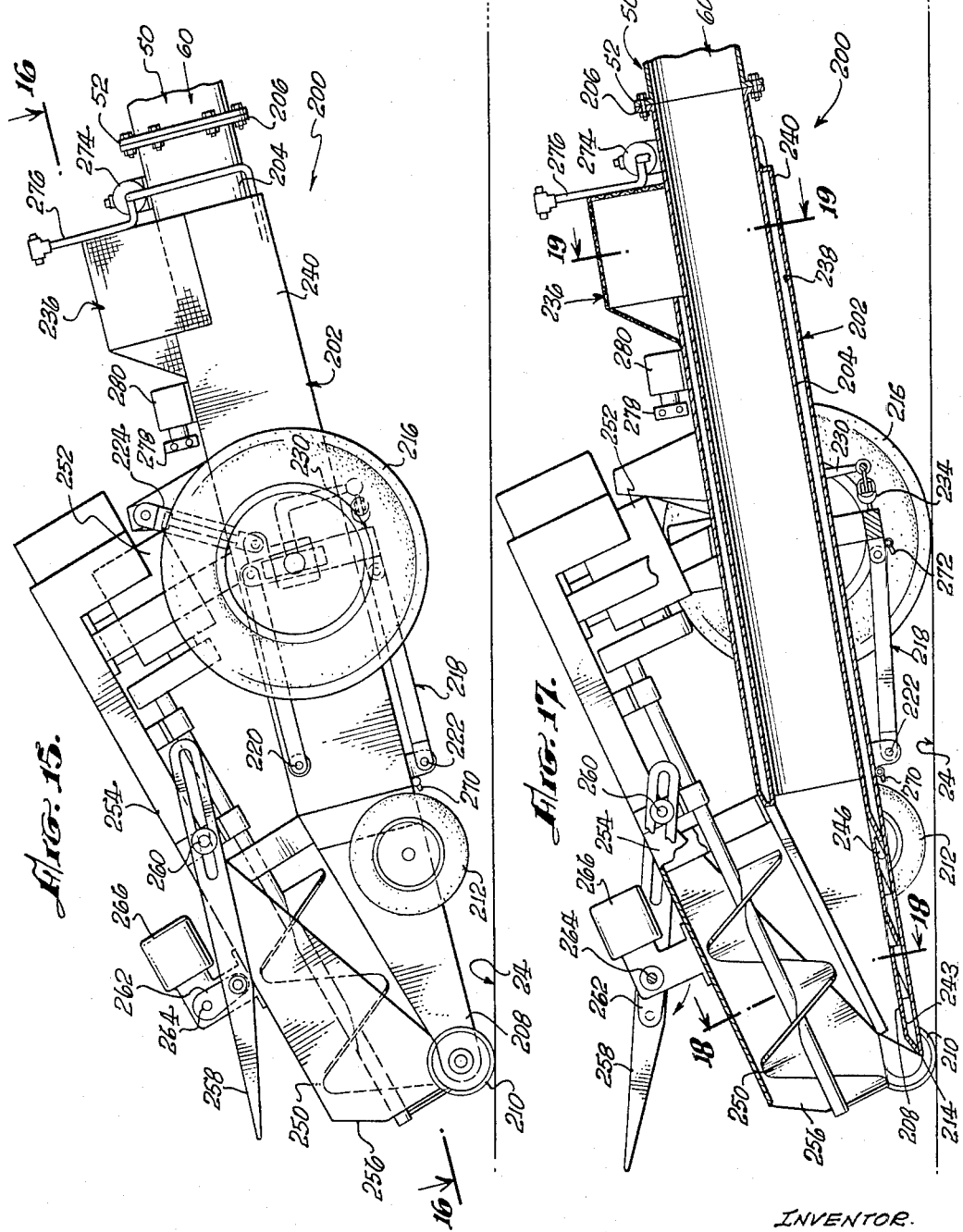

Sept. 20, 1966  G. W. McFARLAND  3,273,942
VACUUM BULK CARGO UNLOADING SYSTEM FOR SHIPS
Filed Sept. 17, 1964  5 Sheets-Sheet 5
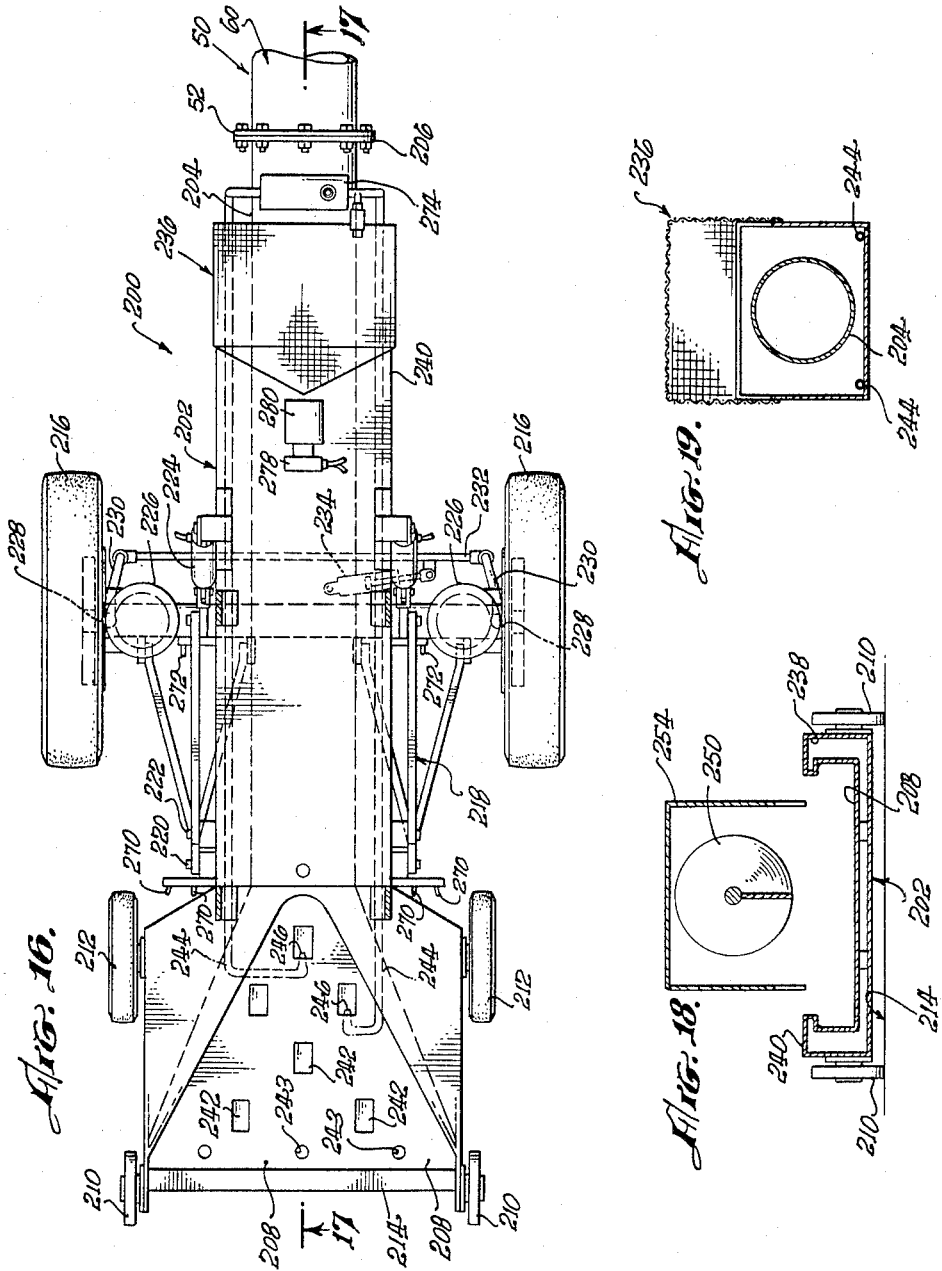
INVENTOR
GLEN W. McFARLAND,
By His Attorneys
HARRIS, KIECH, RUSSELL & KERN.

United States Patent Office 3,273,942
Patented Sept. 20, 1966

---

3,273,942
VACUUM BULK CARGO UNLOADING SYSTEM
FOR SHIPS
Glen W. McFarland, 101 Ocean Ave., Seal Beach, Calif.
Filed Sept. 17, 1964, Ser. No. 397,112
4 Claims. (Cl. 302—17)

The present invention relates in general to an apparatus for unloading bulk cargoes from the holds of ships and, more particularly, to a vacuum conveyor system for unloading such lightweight or low-density bulk materials as copra, grain, or the like, from a hold of a cargo vessel.

Conventional bulk-cargo unloading systems are heavy and cumbersome and require special equipment for handling them and for mounting them in their operating positions, thus making their use time consuming and expensive.

In view of the foregoing, a primary object of the invention is to provide a vacuum unloading system which is light in weight and which may be placed in a position to unload bulk cargo from a hold of a ship without any special mounting or handling equipment.

More particularly, a basic object of the invention is to provide a vacuum unloading system which may be placed in its operating position with the ship's own hoisting gear, and which may be mounted directly on the ship itself quickly and easily.

Still more specifically, an important object of the invention is to provide a vacuum conveyor system for unloading bulk cargo from a hold of a ship through a hatchway formed in the deck above the hold, including: a duct having an inlet end positionable within the hold and having an outlet end positionable adjacent one of the ship's rails and connectible to a vacuum source; universal mounting means connecting the outlet end of the duct to the adjacent ship's rail for universal movement of the duct relative to the ship; means for connecting the ship's hoisting gear to an intermediate section of the duct so that the hoisting gear may be used to support sections of the duct extending downwardly through the hatchway into the hold; inlet means connected to the inlet end of the duct for feeding the bulk cargo thereinto; and the duct having at least one section which is extensible and contractible and at least one section which is flexible to render the inlet means maneuverable within the hold to reach all portions thereof.

A further specific object of the invention is to provide a vacuum bulk cargo unloading system which includes: a duct having an inlet end positionable within the hold and having an outlet end positionable adjacent one rail of the ship and connectible to a vacuum source; the duct comprising a telescoping outlet section which includes the outlet end of the duct and which is adapted to extend generally horizontally across the deck from one rail of the ship to the hatchway; the duct comprising a telescoping intermediate section connected to the outlet section and adapted to extend downwardly through the hatchway into the hold; the duct comprising an inlet section which includes the inlet end of the duct and which is maneuverable within the hold; the duct comprising a flexible section interconnecting the inlet and intermediate sections thereof; universal mounting means connected to the outlet section of the duct adjacent the outlet end thereof, and connectible to one rail of the ship, for supporting the outlet section of the duct for universal movement relative to the ship; means on the duct adjacent the junction of the outlet and intermediate sections thereof for connecting the duct to the ship's hoisting gear; means on the inlet section of the duct for connecting the duct to one of the coamings of the hatchway; and inlet means connected to the inlet end of the duct for feeding the bulk cargo into the duct.

Another important object of the invention is to provide an apparatus for feeding bulk material to a vacuum conveyor system, including: a conduit or duct having an inlet end to receive bulk material and having an outlet end connectible to the vacuum conveyor system to deliver bulk material thereto; vent means spaced from the inlet end of the duct, and preferably located adjacent the outlet end thereof, and communicating with the atmosphere; and passage means for conveying atmospheric air from the vent means to the inlet end of the duct. This construction insures free entry of atmospheric air into the inlet end of the duct along with the bulk material drawn thereinto by the vacuum in the conveyor system. The result is entraining of the bulk material in a stream of air flowing through the duct to minimize any possibility of choking or clogging the duct.

Another object is to provide a passage means, for conveying atmoshperic air to the inlet end of the duct from a vent means adjacent the outlet end thereof, which includes an annulus around the duct.

A further important object of the invention is to provide means for delivering compressed air to the interior of the duct of the feeding apparatus adjacent the inlet end thereof in the event that such duct becomes choked or clogged with the bulk material.

Still another important object of the invention is to provide a remotely controlled apparatus, for feeding the bulk material to the vacuum conveyor system, which is steerable and self propelled so that it may be maneuvered throughout the hold as required to pick up all of the bulk cargo therein.

Another object in the foregoing connection is to provide steerable wheels which are mounted on a chassis for movement between inoperative, retracted and operative, extended positions. Thus, the steerable wheels may be retracted when use thereof is unnecessary, as in removing the bulk cargo from the upper levels of the hold.

A more specific object in the foregoing connection is to provide a remotely controlled, steerable, self-propelled apparatus for feeding bulk material to a vacuum conveyor system, which includes: a chassis carrying a duct having an inlet end to receive the bulk material and having an outlet end connectible to the vacuum conveyor system to deliver the bulk material thereto; vent means carried by the chassis adjacent the outlet end of the duct and communicating with the atmosphere; passage means for conveying atmospheric air from the vent means to the duct adjacent the inlet end thereof; steerable wheels mounted on the chassis for movement relative thereto between an inoperative, retracted position and an operative, extended position; means interconnecting the chassis and the wheels for moving the wheels between the retracted and extended positions; means for steering the wheels; and means on the chassis for driving the wheels.

Another object is to provide air nozzles on the chassis which direct jets of compressed air downwardly and generally toward the inlet end of the duct so as to sweep any bulk material on the bottom of the hold toward the inlet end of the duct.

Yet another object is to provide auger means on the chassis for feeding the bulk material to the inlet end of the duct.

A still further object is to provide oscillatory probe means on the chassis adjacent the inlet of the duct for loosening the bulk material for delivery to the inlet end of the duct.

In order to permit the use of long thin walled duct sections in the vacuum conveyor system of the invention, an important object is to provide a braced duct structure comprising: an elongated thin walled duct having spaced ends; circumferentially spaced, flexible, tensioned bracing members extending longitudinally of the duct; means connecting the ends of the bracing members to the duct adjacent the respective ends of the duct; and spacing means connected to the duct intermediate the ends thereof and engaging the bracing members and spacing intermediate portions of the bracing members radially outwardly from the duct.

A further object is to support the foregoing braced duct structure by means of a lever pivotally connected to the spacing means adjacent the intermediate portion of one of the bracing members.

The foregoing objects, advantages, features and results of the present invention, together with various other objects, advantages, features and results thereof which will be evident to those skilled in the bulk cargo unloading art in the light of this disclosure, may be achieved with the exemplary embodiments of the invention described in detail hereinafter and illustrated in the accompanying drawings, in which:

FIG. 1 is a view showing in transverse cross section a cargo vessel having installed thereon a vacuum conveyor system of the invention for unloading bulk cargo from a hold of such vessel;

FIG. 2 is an enlarged elevational view of one embodiment of an inlet means or apparatus of the invention for feeding bulk cargo into the vacuum conveyor system thereof;

FIG. 3 is a longitudinal sectional view through the feeding apparatus of FIG. 2 and is taken as indicated by the arrowed line 3—3 of FIG. 2;

FIG. 4 is a transverse sectional view taken as indicated by the arrowed line 4—4 of FIG. 3;

FIG. 5 is an enlarged elevational view of a braced duct structure of the invention forming part of the vacuum conveyor system thereof;

FIGS. 6 and 7 are transverse sectional views respectively taken along the arrowed lines 6—6 and 7—7 of FIG. 5.

FIG. 8 is an enlarged, fragmentary sectional view duplicating a portion of FIG. 1 and illustrating one embodiment of a universal mounting means for mounting an outlet end of a duct forming part of the vacuum conveyor system on a rail of the cargo vessel or ship in such a manner as to permit universal movement of the duct, i.e., movement of the duct in all directions, relative to the ship;

FIG. 9 is a view taken as indicated by the arrowed line 9—9 of FIG. 8;

FIG. 10 is a fragmentary sectional view similar to a portion of FIG. 9, but illustrating an alternative way of connecting the universal mounting means to a ship's rail;

FIG. 11 is an enlarged sectional view taken as indicated by the arrowed line 11—11 of FIG. 1;

FIG. 12 is a fragmentary longitudinal sectional view on an enlarged scale illustrating a typical sliding joint incorporated in a telescoping section of the duct of the vacuum conveyor system;

FIG. 13 is an enlarged, fragmentary elevational view of a telescoping outlet section of the duct of the vacuum conveyor system;

FIG. 14 is a transverse sectional view taken as indicated by the arrowed lines 14—14 of FIGS. 1 and 13;

FIG. 15 is a side elevational view of another embodiment of an inlet means or apparatus of the invention for feeding bulk cargo into the vacuum conveyor system thereof;

FIG. 16 is a sectional view taken as indicated by the arrowed line 16—16 of FIG. 15;

FIG. 17 is a sectional view taken as indicated by the arrowed line 17—17 of FIG. 16; and FIGS. 18 and 19 are sectional views respectively taken along the arrowed lines 18—18 and 19—19 of FIG. 17 of the drawings.

*Vacuum conveyor system 20*

Referring initially to FIG. 1 of the drawings, the vacuum conveyor system of the invention is designated generally therein by the numeral 20 and is shown installed on a cargo vessel or ship 22 in position to transfer bulk cargo from a hold 24 of the ship to a suitable point of disposal, not shown, on a pier 26, or the like, adjacent which the ship is docked. In the particular installation illustrated, the vacuum conveyor system 20 is shown as extending upwardly from a lower compartment 28 of the hold 24 through hatchways 30 and 32 in intermediate and weather decks 34 and 36, and as then extending generally horizontally across the weather deck 36 and over one side of the ship 22 above the corresponding ship's rail 38. In the particular ship 22 illustrated, the intermediate deck 34 divides the hold 24 into the lower compartment 28 and an upper compartment 40 and, although the vacuum conveyor system 20 of the invention is shown in position to unload bulk cargo from the lower compartment 28, it may be used to unload bulk cargo from the upper compartment 40 as well.

An important feature of the present invention is that the vacuum conveyor system 20 is a relatively lightweight structure which is readily mountable on the ship's rail 38 for universal movement relative to the ship 22, and which is supportable within the hold 24 by a part of the ship's hoisting gear which is designed generally by the numeral 42. With this construction, the ship's hoisting gear 42 may be used to first swing the vacuum conveyor system 20 of the invention across the weather deck 36 and to then lower it into the hold 24 through the hatchway 32, the vacuum conveyor system subsequently being anchored to the ship's rail 38 by a universal mounting means 44 to be described hereinafter. Thus, installing the vacuum conveyor system 20 of the invention on the ship 22 is a relatively simple operation which requires no special hoisting and mounting equipment, the ship's own hoisting gear 42 being used and the vacuum conveyor system being mounted directly on the structure of the ship by the universal mounting means 44. Thus, installing the vacuum conveyor system 20 of the invention is a relatively simple and inexpensive matter.

Considering the vacuum conveyor system 20 of the invention somewhat more specifically now, it comprises a conduit or duct 50 having an inlet end 52 positionable within the hold 24 and an outlet end 54 positionable adjacent one side of the ship 22 by the universal mounting means 44. The inlet end 52 of the duct 50 has connected thereto an inlet means or apparatus 56 for feeding bulk cargo from the hold 24 into the duct 50, the inlet or feeding apparatus 56 being described in a subsequent section of this specification. Connected to the outlet end 54 of the duct 50 is an outlet conduit 58 leading to a suitable point of disposal, not shown, for the bulk cargo, and connected to a suitable vacuum source, not shown. Preferably, the outlet conduit 58 is flexible to permit the desired universal movement of the duct 50 relative to the ship 22, and to accommodate any motion of the ship relative to the pier 26.

The duct 50 is of sectional construction and includes flexible and extensible and contractible sections to render the feeding apparatus 56 maneuverable to reach all portions of the hold 24. More particularly, the duct 50 includes an inlet section 60 which carries the feeding apparatus 56 and which is suspended within the hold 24 from the structure of the ship 22 in a manner to be described. The next section 62 of the duct 50 is a flexible section of any suitable construction and connects the inlet section 60 to a telescoping intermediate section 64 adapted to extend downwardly through the hatchway 32 into the hold 24. As will be clear from a comparison of the solid line and broken-line positions of the vacuum conveyor system 20 in FIG. 1 of the drawings, the flexible section 62 permits bending of the duct 50 to permit varying the relative angular positions of the inlet and intermediate sections 60 and 64 in maneuvering the feeding apparatus 56 within the hold 24. Connected to the upper end of the telescoping intermediate section 64 is another flexible section 66 of any suitable construction, this flexible section also being capable of bending to permit shifting of various parts of the vacuum conveyor system 20 relative to the ship 22. Connected to the upper end of the flexible section 66 is an elbow section 68 terminating in a telescoping outlet section 70 adapted to extend generally horizontally across the weather deck 36 from the vicinity of the hatchway 32 to the neighborhood of the ship's rail 38. Connected to the outlet end 54 of the telescoping outlet section 70 is the outlet conduit 58 hereinbefore discussed.

The duct 50 is provided adjacent the inner end of the telescoping outlet section 70 with means 72 for attaching the ship's hoisting gear 42 thereto. The attaching means 72 may be of any suitable construction. The universal mounting means 44 is connected to the telescoping outlet section 70 adjacent the outlet end 54 thereof, as will be described hereinafter.

The telescoping outlet section 70 of the duct 50 includes, as best shown in FIGS. 12, 13 and 14, an outer tube 74 having an inner tube 76 telescoped thereinto and sealed relative thereto by suitable annular seals 78. In order to extend and contract the telescoping outlet section 70, a rack 80 is mounted on the inner tube 76 adjacent the end thereof which is connected to the elbow section 68. The rack 80 extends longitudinally of the telescoping outlet section 70 toward the outlet end 54 thereof, and is disposed in a suitable guide 82 on the outer tube 74. The latter carries a reversible motor 84, preferably an electric motor, driving a pinion 86 meshed with the rack 80. As will be apparent, the motor 84 may be energized in one direction or the other to extend or contract the telescoping outlet section 70 of the duct 50 as required to permit the ship's hoisting gear 42 to maneuver the telescoping intermediate section 64 of the duct into any desired position within the hatchway 32.

To provide greater maneuverability, the entire telescoping outlet section 70 may also be movably mounted on the universal mounting means 44. Referring to FIGS. 8 and 9 of the drawings, the universal mounting means 44 includes a tubular guide 88 in which the outer tube 74 of the telescoping outlet section 70 is longitudinally slidable. The outer tube 74 carries a longitudinal rack 90 which extends outwardly through a longitudinal slot in the tubular guide 88, and which has meshed therewith a pinion 92 driven by a reversible motor 94 mounted on the guide 88. As will be apparent, the entire telescoping outlet section 70 may be shifted transversely of the ship 22 in one direction or the other by energizing the motor 94 in the appropriate direction.

Considering the universal mounting means 44 in more detail, it includes a mounting frame 96, FIGS. 8 and 9, suspended in a generally vertical position adjacent the ship's rail 38. More particularly, hooks 98 engage the ship's rail 38 and are secured thereto by set screws 100. (The hooks 98 are oriented horizontally, and face outwardly, with the particular construction for the ship's rail 38 shown in FIGS. 8 and 9. FIG. 10 shows a different ship's rail 102 which requires that the hooks 98 be oriented vertically and that they face downwardly.) Connected to the hooks 98 are the upper ends of chains 104 which are connected at their lower ends to the lower end of the mounting frame 96 to suspend the mounting frame from the ship's rail. This provides a flexible mounting system which permits upward and downward pivoting of the telescoping outlet section 70 of the duct 50 relative to the ship 22.

The tubular guide 88 for the telescoping outlet section 70 is connected to the upper end of the mounting frame 96 by a pivot 106 parallel to the telescoping outlet section 70, and by a swivel fitting 108 which permits the telescoping outlet section to pivot relative to the mounting frame about an axis perpendicular to the telescoping outlet section. As will be apparent, the pivot 106, the swivel fitting 108 and the suspension means provided by the chains 104 permit universal movement of the duct 50 relative to the ship 22, i.e., permit movement of the duct relative to the ship in all directions. Consequently, the duct 50 can be maneuvered into any desired position by means of the ship's hoisting gear 42.

Turning now to a more detailed consideration of the telescoping intermediate section 64 of the duct 50, it is generally similar to the telescoping outlet section 70 thereof and includes telescopically related outer and inner tubes 110 and 112. As will be apparent from a comparison of the solid-line and broken-line showings of the duct 50 in FIG. 1 of the drawings, the inner tube 112 of the telescoping intermediate section 64 may be extended relative to the outer tube 110 thereof to lower the upper end of the inlet section 60 downwardly in the hold 24 to permit the feeding apparatus 56 to reach all portions of the hold.

The inner tube 112 may be extended downwardly relative to the outer tube 110 by means of a rack 114 mounted on the inner tube 112 and a pinion 116 driven by a motor 118 mounted on the outer tube 110. Preferably, this rack and pinion arrangement is used to move the inner tube 112 downwardly only, in which case the motor 118 does not need to be a reversible motor, although it is necessary to interpose a one-way clutch, or the like, not shown, between the motor and the pinion 116.

To lift the inner tube 112 of the telescoping intermediate section 64, and the sections of the duct 50 supported thereby, the outer tube 110 carries a motor 120 driving a cable reel 122, FIGS. 1 and 11. Wound on the reel 122 is a cable 124 trained around a pulley 126 on the inner tube 112 and anchored to the outer tube 110 at 128. As will be apparent, by energizing the motor 120 to wind the cable 124 on the reel 122, the telescoping intermediate section 64 is contracted, this section preferably being extended by means of the rack and pinion 114 and 116 described previously.

The inlet section 60 of the duct 50 may be of different lengths, as illustrated in solid lines and broken lines, respectively, in FIG. 1 of the drawings. As will be apparent, the length selected for the inlet section 60 is determined by the dimensions of the hold 24 and of the hatchways 30 and 32, some ships permitting a relatively short inlet section and others requiring a relatively long one, e.g., of the order of 75 feet or more. In order to minimize the weight of the inlet section 60 so as to keep the overall weight of the vacuum conveyor system 20 as small as possible, it is preferable to use a thin-walled tube 130 and to brace it in a manner which will now be described.

Referring to FIGS. 5 to 7 of the drawings, the tube 130 constituting the inlet section 60 of the duct 50 is shown as including an end section 132 connected to the flexible duct section 62, an end section 134 connected to the feeding apparatus 56, and an intervening section 136 which may be of any length as required by the dimensions of the particular hold to be unloaded. This intervening tube section 136 is so braced as to permit it to be relatively thin walled for lightness.

Considering the bracing means for the tube 130, it includes circumferentially spaced, flexible, tensioned bracing members 138 which interconnect the end sections 132 and 134, these bracing members preferably being formed of wire rope and being shown as three in number. More particularly, the three bracing members 138 are connected to the end tube section 132 in circumferentially spaced relation, and are wound on winches 140 mounted on the end tube section 134 in circumferentially spaced relation. A spider or spacing structure 142 is clamped on the intervening tube section 136 substantially midway between its ends, and carries circumferentially spaced guides 144 through which the flexible bracing members 138 pass. As will be clear from FIGS. 5 and 6 of the drawings, the spacing structure 142 spaces intermediate portions of the flexible bracing members 138 radially outwardly from the intervening tube section 136. When the flexible bracing members 138 are tensioned by means of the winches 140, the result is a braced duct structure which permits the use of relatively thin-walled material for the intervening tube section 136 to minimize its weight.

To support the inlet section 60 of the duct 50, and the feeding apparatus 56 carried thereby, the inlet section 60 is suspended from the structure of the ship 22. For this purpose, the spacing structure 142 carries a lever 146 which is pivotally connected to such spacing structure adjacent one of the bracing-member guides 144, as best shown in FIGS. 5 and 6. The free end of the pivoted lever 146 is suspended from the structure of the ship, preferably one of the coamings 148 of the hatchway 32, by means of a block-and-tackle system 150. As will be clear from a comparison of the solid-line and the broken-line positions for the inlet duct section 60 which are shown in FIG. 1 of the drawings, the length of the block-and-tackle system 150 may be varied to permit maneuvering of the feeding apparatus 56 into any desired part of the hold 24.

*Feeding apparatus 56*

The apparatus 56 for feeding the bulk material in the hold 24 into the vacuum duct 50 is manually operable and comprises a tubular conduit or duct 160 having an outlet end 162 connected to the inlet end 52 of the duct 50. Mounted on and spaced radially outwardly from and rotatable relative to the tube 160 is an outer tube 164 provided with handles 166 adjacent its upper end, i.e., adjacent the outlet end 162 of the inner tube 160. The latter is provided adjacent its upper end with an external annular flange 168 engaged by bearing elements 170 and 172 on the outer tube 164. The annular flange 168 and the bearing elements 170 and 172 serve to permit rotation of the outer tube 164 relative to the inner tube 160, while preventing axial movement of the outer tube relative to the inner. The bearing elements 170 and 172 further serve to space the outer tube 164 radially outwardly from the inner. This same function is performed by spacing elements 174 on the inner tube 160 adjacent its inlet end 176.

The inlet end 176 of the inner tube 160 and the adjacent end of the outer tube 164 are scalloped to provide digging edges which cooperate to loosen the bulk material as the outer tube is rotated relative to the inner. This loosened material is sucked into the inner tube 160, and thence into the duct 50, by the applied vacuum.

To insure a free flow of the bulk material through the inner tube 160 of the feeding apparatus 56, and through the duct 50, it is necessary to provide a free flow of air therethrough. Without such a free flow of air, the bulk material, particularly where it is a material like copra which is composed of large pieces, tends to plug the inlet end of the inner tube 160.

The desired free flow of atmospheric air into the inner tube 160 is achieved by providing a vent means 178 in communication with the atmosphere and a passage means 180 for conducting atmospheric air from the vent means to the inlet end 176 of the inner tube. The vent means 178 is located in a position where it is always in open communication with the atmosphere, this preferably being accomplished by locating it adjacent the outlet end 162 of the inner tube 160. In the particular construction illustrated, the vent means 178 merely comprises openings in the outer tube 164 adjacent the outlet end 162 of the inner tube 160. The passage 180 is formed by the annular space between the inner tube 160 and the outer tube 164. With this construction, unobstructed flow of atmospheric air into the inlet end 176 of the inner tube 160 is assured to avoid plugging or clogging of the inner tube 160.

Also disposed between the inner and outer tubes 160 and 164 are longitudinal air passages 182, shown as formed by channels secured to the exterior of the inner tube. These longitudinal passages terminate in radial ports 184 for delivering air to the interior of the inner tube 160 adjacent its inlet end 176. In the particular construction illustrated, the other or upper ends of the longitudinal passages 182 communicate with the annular passage 180 between the inner and outer tubes 160 and 164, so that atmospheric air flows therethrough also. However, as will be disclosed hereinafter in connection with the embodiment of the invention illustrated in FIGS. 15 to 19 of the drawings, the upper ends of the longitudinal passages 182 may be connected to a compressed air source, not shown. With this construction, if the inner tube 160 becomes choked or clogged with the bulk material, bursts of compressed air may be introduced into the inner tube adjacent its inlet end 176 to clear the inner tube.

As will be apparent from FIG. 1 of the drawings, the feeding apparatus 56 may be maneuvered into any desired position within the hold 24 as required to remove all of the bulk cargo therefrom. Any portion of the hold may be reached by suitably extending or contracting the telescoping duct sections 64 and 70, raising or lowering the entire vacuum conveyor system 20 by means of the ship's hoistering gear 42, and/or shortening or lengthening the block-and-tackle system 150. Also, the telescoping intermediate section 64 of the duct 50 may be of any length necessary for the particular hold being unloaded, two different lengths being shown in solid and broken lines in FIG. 1 of the drawings for illustrative purposes in this respect.

While the disclosure of the invention has thus far been limited to the manually operable apparatus 56 for feeding the bulk material into the vacuum conveyor system 20, a power operated feeding apparatus may be substituted. Such an apparatus is designated generally by the numeral 200 in FIGS. 15 to 19 of the drawings and will now be described.

*Feeding apparatus 200*

Referring to FIGS. 15 to 19 of the drawings, the apparatus 200 is connectible to the inlet end 52 of the vacuum duct 50 to feed the bulk material in the hold 24 into the vacuum duct in the same general manner as the apparatus 56. However, the apparatus 200 is not manually operated, but is a steerable, selfpropelled apparatus which can be maneuvered over the bottom of the hold 24, preferably by remote control, after enough of the bulk cargo has been removed to expose the bottom of the hold. In other words, the apparatus 200 is used in a suspended position until enough of the bulk cargo has been unloaded to permit the apparatus to operate on the bottom of the hold 24.

Considering the apparatus 200 in more detail, it comprises a chassis 202 carrying a vacuum conduit or duct 204 having an outlet end 206 connected to the inlet end 52 of the vacuum duct 50. The conduit 204 terminates in an inlet end 208, adapted to receive the bulk material, which is best shown in FIGS. 16 and 18 and which can perhaps best be described as having the general configuration of an upwardly facing scoop, considering the apparatus in its generally horizontal position.

The scoop 208 of the apparatus 200 is provided thereon with two pairs of idler wheels 210 and 212, the idler wheels 210 being relatively small wheels located adjacent the leading edge 214 of the scoop. The idler wheels 212 are somewhat larger wheels spaced toward the outlet end 206 of the conduit 204 from the idler wheels 210. Either or both sets of wheels 210 and 212 may engage the bottom of the hold 24 to support part of the weight of the apparatus 200 when sufficient of the bulk cargo has been removed to expose the bottom of the hold.

Prior to engagement of the wheels 210 and/or 212 with the bottom of the hold, the weight of the apparatus 200 is supported by the hereinbefore-described suspension system for the vacuum duct 50. Upon engagement of the wheels 210 and/or 212 with the bottom of the hold, they support part of the weight of the apparatus 200, the remainder being supported either by the suspension system for the vacuum duct 50, or by two steerable, powered, retractable, main wheels 216 which may be lowered from retracted positions, shown in FIG. 15, to extended positions, shown in FIG. 17. When the main wheels 216 are in their extended positions and engage the bottom of the hold 24, they may be used to maneuver the apparatus 200 into any desired position within the hold as required to remove all of the bulk cargo therefrom. Preferably, the wheels 216 are controlled from a remote point, the same being true of other powered components of the apparatus 200 to be described. Any suitable system, not shown, of control elements, power supply elements, and the like, may extend from the apparatus 200 to the remote control point.

The main wheels 216 are mounted on a parallelogram-type linkage 218 which is pivotally connected to the chassis 202 at 220 and 222. Interconnecting the linkage 218 and the chassis 202 is a fluid motor 224 of the reciprocating type which serves to extend or retract the main wheels 216 as desired. The motor 224 may be either air or liquid operated.

As best shown in FIG. 16, the main wheels 216 are individually powered by motors 226. These may be electric motors, air motors, liquid motors, or the like, and may be connected to the respective wheels 216 in any suitable manner. The main wheels 216 are mounted on the linkage 218 by means of king pins 228 which render these wheels steerable. Steering is accomplished by providing the wheels 216 with steering arms 230 interconnected by a tie rod 232 having a steering fluid motor 234 of the reciprocating type connected thereto. This motor may be either air or liquid operated and is anchored to the chassis 202.

As will be apparent, when the main wheels 216 are lowered into engagement with the bottom of the hold 24, as shown in FIG. 17 in particular, the apparatus 200 may be maneuvered into any desired position within the hold by energizing the wheel motors 226 and the steering motor 234 appropriately. Consequently, complete removal of all of the bulk cargo is readily achieved, which is an important feature.

The apparatus 200 includes a vent means 236 located adjacent the outlet end 206 of the conduit 204 so that it is in a location exposed to the atmosphere at all times. The vent means 236 communicates with an annular air passage 238 around the conduit 204 and formed in part by this conduit and in part by an outer housing 240 therearound. The portion of the inner conduit 204 which constitutes the bottom wall of the scoop 208 (considering the apparatus 200 in its generally horizontal position) is provided therein with louvered openings 242 and ports 243 for admitting atmospheric air into the inlet end of the conduit 204 so as to insure free flow of the bulk material through this conduit and into and through the vacuum duct 50.

As best shown in FIGS. 16 and 17, compressed air lines 244 terminate in nozzles 246 which are located in certain of the louvered openings 242 and which face in the downstream direction, i.e., which face in the direction of the outlet end 206 of the conduit 204. With this construction, if the conduit 204, and particularly the inlet end thereof, becomes choked or clogged with the bulk material being unloaded, shots of compressed air may be introduced, through the lines 244 and the nozzles 246, to break up any jam, which is an important feature.

To insure a reasonably constant flow of bulk material to the scoop 208, the apparatus 200 includes a screw conveyor or auger 250 mounted on the chassis 202 above the scoop (again considering the apparatus 200 in its generally horizontal position) and driven by a motor 252, such as an electric motor, on the chassis. To prevent the bulk material from falling directly onto the scoop 208, the auger 250 is covered and partially enclosed by a housing 254. The latter is provided with an open end 256, at the forward end of the apparatus 200, through which the auger 250 feeds the bulk material to the scoop 208 in a more-or-less continuous stream. From the scoop 208, this bulk material is sucked into the conduit 204, and thence into the duct 50, by the vacuum applied to the outlet end 54 of the latter.

Occasionally, the bulk cargo in the hold 24 packs sufficiently that the packed portions thereof must be broken up before the material can be fed to the scoop 208 by the auger 250. To break up such packed portions of the cargo, the apparatus 200 includes forwardly extending probes 258 mounted on the chassis 202 above and slightly forwardly of the auger 250. The rearward ends of these probes are provided with longitudinal slots receiving pins 260 on the chassis 202, the probes being slidable longitudinally thereof relative to the pins 260. Pivotally connected to the probes 258 adjacent their forward ends are cranks 262 mounted on a crankshaft 264 driven by a motor 266, preferably an electric motor. As will be apparent from a comparison of FIGS. 15 and 17, the motor 266 rotates the cranks 262 to oscillate the probes 258 forwardly and rearwardly, and upwardly and downwardly, whereby the probes effectively break up and loosen any packed portions of the cargo. The loosened material is then fed to the scoop 208 by the auger 250.

The under side of the chassis 202 (considering the apparatus 200 in its generally horizontal position) is provided with transversely spaced air nozzles 270 which are directed downwardly and generally toward the leading edge 214 of the scoop 208. Similarly oriented and transversely spaced air nozzles 272 are carried by the main-wheel linkage 218 in a location such that they are near the bottom of the hold 24 when the main wheels 216 are extended and are in engagement with the bottom of the hold. By discharging compressed air through the nozzles 270 and 272, any residual bulk material under the apparatus 200 may be swept forwardly so that it can be picked up by the suction at the inlet end of the conduit 204. Thus, the nozzles 270 and 272 insure recovery of virtually all of the bulk material from the bottom of the hold.

Mounted on the chassis 202 is a compressed air manifold 274 which may be connected to a remote source of compressed air by a line 276. The various air nozzles 246, 270 and 272 are suitably connected to the manifold 274. Any other air-operated components may also be connected to this manifold. Also mounted on the chassis 202 is a hydraulic pump 278 driven by an electric motor 280. Any hydraulically operated components of the apparatus 200 may be supplied by this pump.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:

1. In a vacuum conveyor system for unloading bulk cargo from a hold of a ship through a hatchway formed in a deck above the hold, the ship being equipped with hoisting gear, the combination of:
   (a) a duct having an inlet end positionable within the hold and having an outlet end positionable adjacent one side of the ship and connectible to a vacuum source;
   (b) universal mounting means connected to said duct adjacent said outlet end thereof for supporting said duct for universal movement relative to the ship;
   (c) means on said duct intermediate said inlet and outlet ends thereof for connecting said duct to the ship's hoisting gear;

(d) said duct including extensible and contractible and flexible sections to render said inlet end of said duct maneuverable within the hold; and (e) inlet means connected to said inlet end of said duct for feeding the bulk cargo into said duct.

2. In a vacuum conveyor system for unloading bulk cargo from a hold of a ship through a hatchway formed in a deck above the hold, the ship being equipped with hoisting gear, the combination of:

(a) a duct having an inlet end positionable within the hold and having an outlet end positionable adjacent one side of the ship and connectible to a vacuum source;

(b) universal mounting means connected to said duct adjacent said outlet end thereof for supporting said duct for universal movement relative to the ship;

(c) means on said duct intermediate said inlet and outlet ends thereof for connecting said duct to the ship's hoisting gear;

(d) said duct including extensible and contractible and flexible sections to render said inlet end of said duct maneuverable within the hold;

(e) inlet means connected to said inlet end of said duct for feeding the bulk cargo into said duct;

(f) said inlet means including a conduit having an inlet end for the bulk material and having an outlet end connected to said inlet end of said duct;

(g) said inlet means including vent means located adjacent said outlet end of said conduit and communicating with the atmosphere; and (h) said inlet means including passage means for conveying atmospheric air from said vent means to said inlet end of said conduit.

3. In a vacuum conveyor system for unloading bulk cargo from a hold of a ship through a hatchway formed in a deck above the hold, the ship being equipped with hoisting gear, the combination of:

(a) a duct having an inlet end positionable within the hold and having an outlet end positionable adjacent one side of the ship and connectible to a vacuum source;

(b) said duct comprising a telescoping outlet section which includes said outlet end of said duct and which is adapted to extend generally horizontally across the deck from one side of the ship to the hatchway;

(c) said duct comprising a telescoping intermediate section connected to said outlet section and adapted to extend downwardly through the hatchway into the hold;

(d) said duct comprising an inlet section which includes said inlet end of said duct and which is maneuverable within the hold;

(e) said duct comprising a flexible section interconnecting said inlet and intermediate sections thereof;

(f) universal mounting means connected to said outlet section of said duct adajacent said outlet end thereof for supporting said outlet section of said duct for universal movement relative to the ship;

(g) means on said duct adjacent the junction of said outlet and intermediate sections thereof for connecting said duct to the ship's hoisting gear;

(h) means on said inlet section of said duct for connecting said duct to the ship's structure; and (i) inlet means connected to said inlet end of said duct for feeding the bulk cargo into said duct.

4. In a vacuum conveyor system for unloading bulk cargo from a hold of a ship through a hatchway formed in a deck above the hold and bounded by coamings, the ship being equipped with rails along its side and being equipped with hoisting gear, the combination of:

(a) a duct having an inlet end positionable within the hold and having an outlet end positionable adjacent one rail of the ship and connectible to a vacuum source;

(b) said duct comprising a telescoping outlet section which includes said outlet end of said duct and which is adapted to extend generally horizontally across the deck from one rail of the ship to the hatchway;

(c) said duct comprising a telescoping intermediate section connected to said outlet section and adapted to extend downwardly through the hatchway into the hold;

(d) said duct comprising an inlet section which includes said inlet end of said duct and which is maneuverable within the hold;

(e) said duct comprising a flexible section interconnecting said inlet and intermediate sections thereof;

(f) universal mounting means connected to said outlet section of said duct adajacent said outlet end thereof, and connectible to one rail of the ship, for supporting said outlet section of said duct for universal movement relative to the ship;

(g) means on said duct adjacent the junction of said outlet and intermediate sections thereof for connecting said duct to the ship's hoisting gear;

(h) means on said inlet section of said duct for connecting said duct to one end of the coamings of the hatchway; and (i) inlet means connected to said inlet end of said duct for feeding the bulk cargo into said duct.

References Cited by the Examiner

UNITED STATES PATENTS

| | | | |
|---|---|---|---|
| 1,195,830 | 8/1916 | McWane | 138—172 |
| 1,597,438 | 8/1926 | Ennis | 302—17 |
| 1,773,655 | 8/1930 | Vorturon | 138—172 |
| 2,301,617 | 11/1942 | Cox et al. | 302—58 |
| 2,687,920 | 8/1954 | Cherewick | 302—17 |
| 2,905,506 | 9/1959 | Kristensen | 302—58 |
| 3,021,180 | 2/1962 | Crump | 302—56 |
| 3,122,398 | 2/1964 | Tucker | 302—58 |
| 3,155,432 | 11/1964 | Hubbard | 302—56 |

EVON C. BLUNK, *Primary Examiner.*

ANDRES H. NIELSEN, *Examiner.*